(12) United States Patent
Bragg et al.

(10) Patent No.: US 7,603,292 B1
(45) Date of Patent: Oct. 13, 2009

(54) METHODS AND SYSTEMS FOR PROVIDING A GIFT REGISTRY

(75) Inventors: Richard William Bragg, Mountain View, CA (US); Michael John Souza Brazil, Pleasanton, CA (US); Orkut Buyukkokten, Mountain View, CA (US); Kevin David Fox, Mountain View, CA (US); Thomas Y. Galloway, Mountain View, CA (US)

(73) Assignee: Google Inc., Mountain View, CA (US)

( * ) Notice: Subject to any disclaimer, the term of this patent is extended or adjusted under 35 U.S.C. 154(b) by 492 days.

(21) Appl. No.: 10/882,699

(22) Filed: Jun. 30, 2004

(51) Int. Cl.
G06Q 30/00 (2006.01)
(52) U.S. Cl. .......................... 705/26; 705/27
(58) Field of Classification Search ............ 705/26, 705/27
See application file for complete search history.

(56) References Cited

U.S. PATENT DOCUMENTS

| | | | |
|---|---|---|---|
| 6,073,138 A | 6/2000 | de l'Etraz et al. | |
| 6,256,648 B1 | 7/2001 | Hill et al. | |
| 6,389,372 B1 | 5/2002 | Glance et al. | |
| 6,594,673 B1 | 7/2003 | Smith et al. | |
| 6,609,106 B1* | 8/2003 | Robertson ................. | 705/26 |
| 6,782,425 B1 | 8/2004 | Germscheid et al. | |
| 6,837,436 B2* | 1/2005 | Swartz et al. .......... | 235/472.02 |
| 6,865,546 B1* | 3/2005 | Song ...................... | 705/26 |
| 6,912,505 B2* | 6/2005 | Linden et al. ............ | 705/14 |
| 7,013,292 B1* | 3/2006 | Hsu et al. ................ | 705/37 |
| 7,069,308 B2 | 6/2006 | Abrams | |
| 7,269,590 B2 | 9/2007 | Hull et al. | |
| 7,356,490 B1* | 4/2008 | Jacobi et al. ............. | 705/27 |
| 7,433,832 B1* | 10/2008 | Bezos et al. ............. | 705/26 |
| 2002/0116466 A1 | 8/2002 | Trevithick et al. | |
| 2002/0124053 A1 | 9/2002 | Adams et al. | |
| 2003/0050977 A1 | 3/2003 | Puthenkulam et al. | |
| 2004/0042599 A1 | 3/2004 | Zaner et al. | |
| 2004/0088325 A1 | 5/2004 | Elder et al. | |
| 2004/0122803 A1 | 6/2004 | Dom et al. | |
| 2005/0171832 A1 | 8/2005 | Hull et al. | |
| 2005/0209999 A1 | 9/2005 | Jou | |
| 2005/0210409 A1 | 9/2005 | Jou | |

(Continued)

FOREIGN PATENT DOCUMENTS

JP 11265369 A 9/1999

(Continued)

OTHER PUBLICATIONS

Felicite.com; Internet Archive Wayback Machine, www.archive.org; www.felicite.com; May 30, 2003, Jun. 3, 2003, Jun. 21, 2003, 17pgs.*

(Continued)

Primary Examiner—Robert M. Pond
(74) Attorney, Agent, or Firm—Fenwick & West LLP

(57) ABSTRACT

Systems and methods for providing a gift registry are described. In one described method, gift interest data is identified. A gift registry comprising a gift indicator associated with the gift interest data is generated. An audience criterion is identified, and an inquiry signal is received. The inquiry signal is evaluated for satisfaction of the audience criterion, and the gift registry is output if the inquiry signal satisfies the audience criterion.

49 Claims, 4 Drawing Sheets

U.S. PATENT DOCUMENTS

2005/0246420 A1 11/2005 Little
2005/0267940 A1 12/2005 Galbreath et al.

FOREIGN PATENT DOCUMENTS

| JP | 2002132604 A | 5/2002 |
|---|---|---|
| WO | WO 00/68860 A2 | 11/2000 |
| WO | WO 00/68860 A3 | 7/2003 |

OTHER PUBLICATIONS

PlanetAll: Internet ArchiveWayback Machine; www.archive.org/www.planetall.com; Nov. 1997; 19 pages.*

Accounts Website, web page at http://www.cs.rice.edu/~ssiyer/accounts/, as available via the Internet and printed on Jul. 29, 2004.

Adamic, L. et al., "A Social Network Caught in the Web," web page at http://firstmonday.org/issues/issue8_6/adamic/, as available via the Internet and printed on Jul. 28, 2004.

Amazon.com, "Amazon.com Friends and Favorites," web page at http://www.amazon.com/exec/obidos/subst/community/community-home.html/ref=pd_ys_..., as available via the Internet and printed on Feb. 27, 2004.

Amazon.com, "Purchase Circles," web page at http://www.amazon.com/exec/obidos/tg/browse/-/468604/ref=cm_pc_faq/002-0759267-82..., as available via the Internet and printed on Feb. 27, 2004.

Amazon.com, "Wish Lists," web page at http://www.amazon.com/exec/obidos/tg/browse/-/897204/ref=ya_hp_reg_1/002-9880811-..., as available via the Internet and printed on Feb. 18, 2004.

Doctorow, copy, "Running Notes From Revenge of the User: Lessons from Creator/User Battles," web page at http://craphound.com/danahetcon04.txt, as available via the Internet and printed Jul. 28, 2004.

Dillard's, "Registry Welsome," web page at http://www.dillards.com/wishlist/WLWelcome.jsp?rType=01, as available via the Internet and printed on Aug. 4, 2004.

Microsoft Corporation, "Social Networking in the Digital Age: Is Friendster the 'Next Big Thing'?" web page at http://mobilemomentum.msn.com/article.aspx? aid=4, as available via the Internet and printed on Jul. 29, 2004.

Multiple, "About Multiply," web page at http://multiply.com/info/about, as available via the Internet and printed on May 3, 2004.

Multiply, "Help," web page at http://multiply.com/info/help, as available via the Internet and printed on May 3, 2004.

Multiply, "Multiply Privacy Policy," web page at http://multiply.com/info/privacy, as available via the Internet and printed on May 3, 2004.

Multiply, "Multiply Terms of Service," web page at http://multiply.com/info/tos, as available via the Internet and printed on printed May 3, 2004.

PayPal, "About Us," web page at http://www.paypal.com/cgi-bin/webscr?cmd=p/gen/about-outside, available via the Internet and printed on Aug. 4, 2004.

Sullivan, D., "Is It Really Personalized Search?" http://www.searchenginewatch.com, as available via the Internet and printed on May 13, 2004.

Target,"Target.com Wish List," web page at http://www.target.com/gp/registry.html/ref=nav_t_gc/601-1917759-0687329?%5Fencoding=UTF8&type=wishlist, as available via the Internet and printed on Aug. 4, 2004.

Target, "Target.com Create a Gift Reminder," web page at http://www.target.com/exec/obidos/reminder-add/ref=cm_gr_cont_gr/601-1917759-0687329?cont-page=reminders-signed-in-co..., as available via the Internet and printed on Aug. 4, 2004.

Tribe.net, "Listings Directory," web page at http://www.tribe.net/tribe/servlet/template/pub,Listings.vm, as available via the Internet and printed on Jun. 28, 2004.

* cited by examiner

METHODS AND SYSTEMS FOR PROVIDING A GIFT REGISTRY

FIELD OF THE INVENTION

The invention generally relates to gift registries. More particularly, the invention relates to methods and systems for providing a gift registry.

BACKGROUND

Conventional websites such as those hosted on Friendster™, Yahoo!™, Tribe™, Tickle™, or other web sites, facilitate interaction between members of a network or group. Most conventional gift registries, such as wedding-gift registries at retail stores, Internet-based gift registries at commercial websites, have significant limitations, such as a lack of customizability, inability to restrict access to the registry, a limited selection of gifts that may be included on the registry, and a limited selection of vendors from which a gift may be purchased. A conventional gift registry may not allow a registrant to limit the audience to which the gift registry or a portion thereof may be output in an effective manner. Also, a conventional gift registry may force the registrant to choose a particular product or service, rather than including a broad gift category or idea on the gift registry. Moreover, some conventional gift registries may be associated with a single vendor or merchant, and may not allow the users of the gift registry to easily find other vendors' prices for a gift on the gift registry.

SUMMARY

Embodiments of the present invention comprise systems and methods for providing an improved gift registry. One embodiment of the present invention comprises identifying gift interest data, for example, a particular category of gift interest, such as toys, and generating a gift registry comprising a gift indicator associated with the gift interest data. This embodiment may further comprise identifying an audience criterion (such as "friends," "family," "acquaintances," "or other criteria), and receiving an inquiry signal. The inquiry signal can be evaluated for satisfaction of the audience criterion, and the gift registry can be output if the inquiry signal satisfies the audience criterion.

This embodiment is mentioned not to limit or define the invention, but to provide an example of an embodiment of the invention to aid understanding thereof. Illustrative embodiments are discussed in the Detailed Description, and further description of the invention is provided there. Advantages offered by the various embodiments of the present invention may be further understood by examining this specification.

BRIEF DESCRIPTION OF THE FIGURES

These and other features, aspects, and advantages of the present invention are better understood when the following Detailed Description is read with reference to the accompanying drawings, wherein.

DETAILED DESCRIPTION

Overview

Embodiments of the present invention provide systems and methods for providing a gift registry. A variety of systems and methods may be implemented according to the present invention, and they may operate in a variety of environments. By way of introduction and example, the subject matter of the invention in one embodiment may relate to allowing a user to create a gift registry. The user may explicitly select a specified product or service to include on his or her gift registry. The user may also request a type, category, or class of desired gifts by entering gift criteria and/or keywords. Information related to the user's interests, hobbies, or recreational activities may be used to automatically generate a gift registry with gifts selected based on this information. The created gift registry may exist for more than just one occasion, and may provide a location that all of the user's friends, family, and acquaintances may access to locate a gift desired by the user for any gift-giving occasion. The user may also be allowed to restrict access to his or her gift registry, or a portion thereof, to only those people that he or she wishes to be able to view it. This introduction is given to introduce the reader to the general subject matter of the invention. By no means is the invention limited to such subject matter. Illustrative embodiments of the invention are described below.

System Architecture

Figure 1:
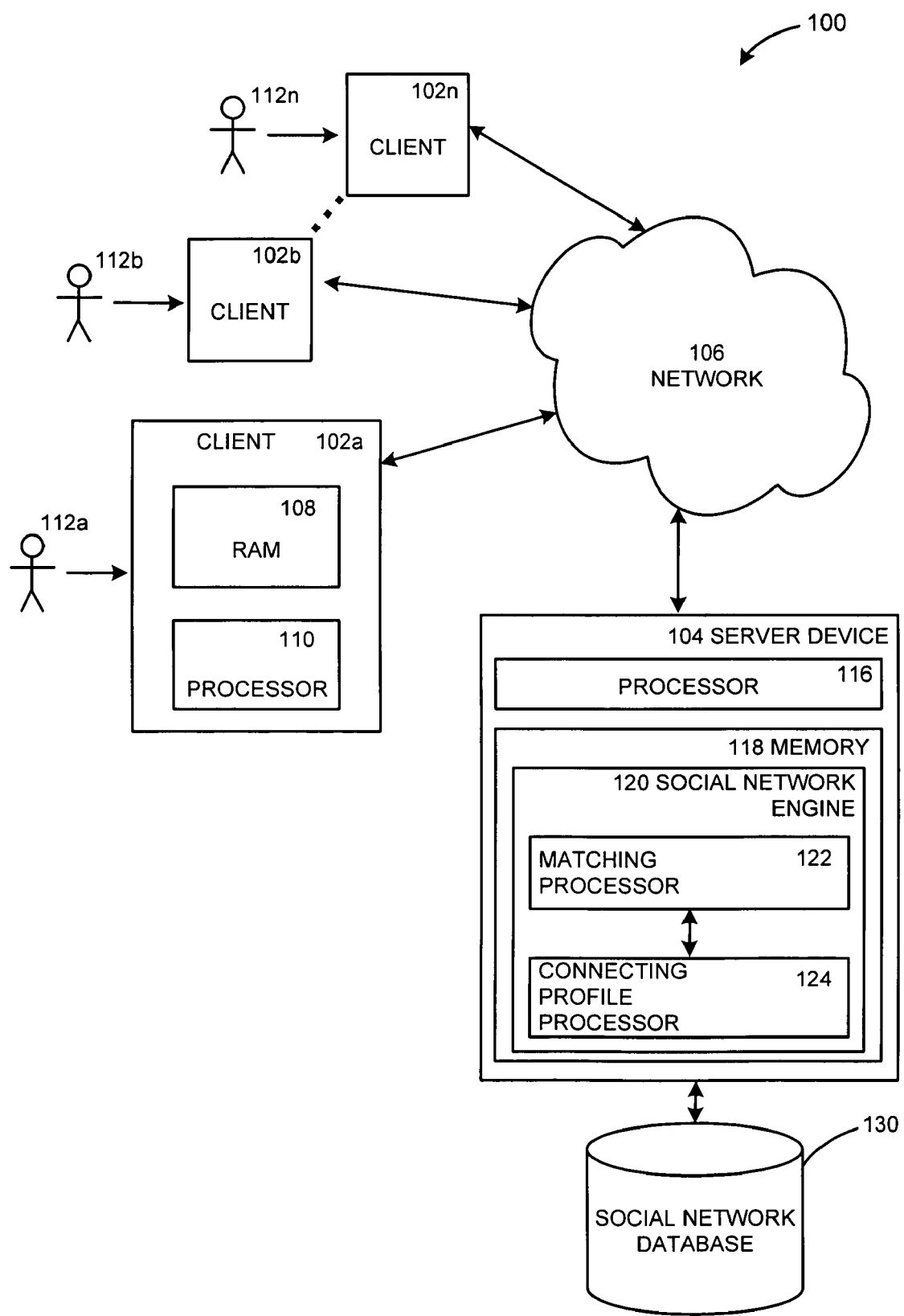
FIG. 1 is a diagram of a system according to one embodiment of the present invention.

Referring now to the drawings in which like numerals indicate like elements throughout the several figures, FIG. 1 is a diagram of a system according to one embodiment of the present invention. The system 100 shown in FIG. 1 comprises multiple client devices 102a-n in communication with a server device 104 over a network 106. In one embodiment, the network 106 shown comprises the Internet. In other embodiments, other networks, such as an intranet, WAN, or LAN may be used. Moreover, methods according to the present invention may operate within a single computer.

The client devices 102a-n shown each comprises a computer-readable medium, such as a random access memory (RAM) 108 coupled to a processor 110. The processor 110 executes computer-executable program instructions stored in memory 108. Such processors may comprise a microprocessor, an ASIC, and state machines. Such processors comprise, or may be in communication with, media, for example computer-readable media, which stores instructions that, when executed by the processor, cause the processor to perform the steps described herein. Embodiments of computer-readable media include, but are not limited to, an electronic, optical, magnetic, or other storage or transmission device capable of providing a processor, such as the processor 110 of client 102a, with computer-readable instructions. Other examples of suitable media include, but are not limited to, a floppy disk, CD-ROM, DVD, magnetic disk, memory chip, ROM, RAM, an ASIC, a configured processor, all optical media, all magnetic tape or other magnetic media, or any other medium from which a computer processor can read instructions. Also, various other forms of computer-readable media may transmit or carry instructions to a computer, including a router, private or public network, or other transmission device or channel, both wired and wireless. The instructions may comprise code from any suitable computer-programming language, including, for example, C, C++, C#, Visual Basic, Java, Python, Perl, and JavaScript.

Client devices 102*a-n* may also comprise a number of external or internal devices such as a mouse, a CD-ROM, DVD, a keyboard, a display, or other input or output devices. Examples of client devices 102*a-n* are personal computers, digital assistants, personal digital assistants, cellular phones, mobile phones, smart phones, pagers, digital tablets, laptop computers, Internet appliances, and other processor-based devices. In general, a client device 102*a* may be any type of suitable processor-based platform that is connected to a network 106 and that interacts with one or more application programs. Client devices 102*a-n* may operate on any operating system capable of supporting a browser or browser-enabled application, such as Microsoft® Windows® or Linux. The client devices 102*a-n* shown include, for example, personal computers executing a browser application program such as Microsoft Corporation's Internet Explorer™, Netscape Communication Corporation's Netscape Navigator™, and Apple Computer, Inc.'s Safari™.

Through the client devices 102*a-n*, users 112*a-n* can communicate over the network 106 with each other and with other systems and devices coupled to the network 106. As shown in FIG. 1, a server device 104 is also coupled to the network 106.

The server device 104 shown comprises a server executing a social network engine application program, also known as a social network engine 120. The social network engine 120 allows users, such as user 112*a*, to interact with and participate in a social network. A social network can refer to a computer network connecting entities, such as people or organizations, by a set of social relationships, such as friendship, co-working, or information exchange. Of course, a social network can refer to a computer application or data connecting such entities by such social relationships. Examples of social networks include Orkut.com and Friendster.com.

Social networks can comprise any of a variety of suitable arrangements. An entity or member of a social network can have a profile and that profile can represent the member in the social network. The social network can facilitate interaction between member profiles and allow associations or relationships between member profiles. Associations between member profiles can be one or more of a variety of types, such as friend, co-worker, family member, business associate, common-interest association, and common-geography association. Associations can also include intermediary relationships, such as friend of a friend, and degree of separation relationships, such as three degrees away.

Associations between member profiles can be reciprocal associations. For example, a first member can invite another member to become associated with the first member and the other member can accept or reject the invitation. A member can also categorize or weigh the association with other member profiles, such as, for example, by assigning a level to the association. For example, for a friendship-type association, the member can assign a level, such as acquaintance, friend, good friend, and best friend, to the associations between the member's profile and other member profiles. In one embodiment, the social network engine 120 can determine the type of association between member profiles, including, in some embodiments, the degree of separation of the association and the corresponding weight or level of the association.

Similar to the client devices 102*a-n*, the server device 104 shown comprises a processor 116 coupled to a computer-readable memory 118. The server device 104 is in communication with a social network database 130. Server device 104, depicted as a single computer system, may be implemented as a network of computer processors. Examples of a server device 104 are servers, mainframe computers, networked computers, a processor-based device, and similar types of systems and devices. Client processor 110 and the server processor 116 can be any of a number of computer processors, such as processors from Intel Corporation of Santa Clara, Calif. and Motorola Corporation of Schaumburg, Ill.

Memory 118 contains a social network engine application program, also known as a social network engine 120. The social network engine 120 facilitates members, such as user 112*a*, interacting with and participating in a social network. A social network can comprise profiles that can be associated with other profiles. Each profile may represent a member and a member can be, for example, a person, an organization, a business, a corporation, a community, a fictitious person, or other entity. Each profile can comprise entries, and each entry can comprise information associated with a profile. Examples of entries for a person profile can comprise information regarding relationship status, birth date, age, children, ethnicity, religion, political view, sense of humor, sexual orientation, fashion preferences, smoking habits, drinking habits, pets, hometown location, passions, sports, activities, favorite books and music, TV or movie preferences, favorite cuisines, email addresses, location information, IM name, phone number, address, skills, career, or any other information describing, identifying, or otherwise associated with a profile. Entries for a business profile can comprise market sector, customer base, location, supplier information, net profits, net worth, number of employees, stock performance, or other types of information associated with the business profile. Additionally, entries associated with a profile can comprise associations with other profiles. Associations between profiles within a social network can include, for example, friendships, business relationships, acquaintances, community associations, activity partner associations, common interest associations, common characteristic associations, or any other suitable type of association between profiles.

The social network engine 120 can comprise a rating processor 122. The rating processor 122 can facilitate the ability of the user 112*a* to rate other members and can determine overall ratings for each member. The rating processor can cause the display on the client device 102*a* of a ratings interface. The ratings interface can display member names associated with the user 112*a* and allow the user 112*a* to rate each associated member. A member's overall rating can be contained in and displayed with the member's profile. The member's overall rating can in part determine the appearance of a member's icon.

Server device 104 also provides access to storage elements, such as a social network storage element, in the example shown in FIG. 1, a social network database 130. The social network database 130 can be used to store member profiles. Data storage elements may include any one or combination of methods for storing data, including without limitation, arrays, hash tables, lists, and pairs. The server device 104 can access other similar types of data storage devices. The social network engine 120 can receive data comprising the members' profiles from the social network database 130 and can also send data comprising member profiles to the social network database 130 for storage. The social network database 130 may be physically attached or otherwise in communication with the social network engine 120 by way of a network or other connection.

It should be noted that the present invention might comprise systems having different architecture than that which is shown in FIG. 1. For example, in some systems according to the present invention, server device 104 may comprise a single physical or logical server. The system 100 shown in FIG. 1 is merely exemplary, and is used to help explain the social networks and methods illustrated in FIGS. 2-5.

Exemplary Social Network

Figure 2:
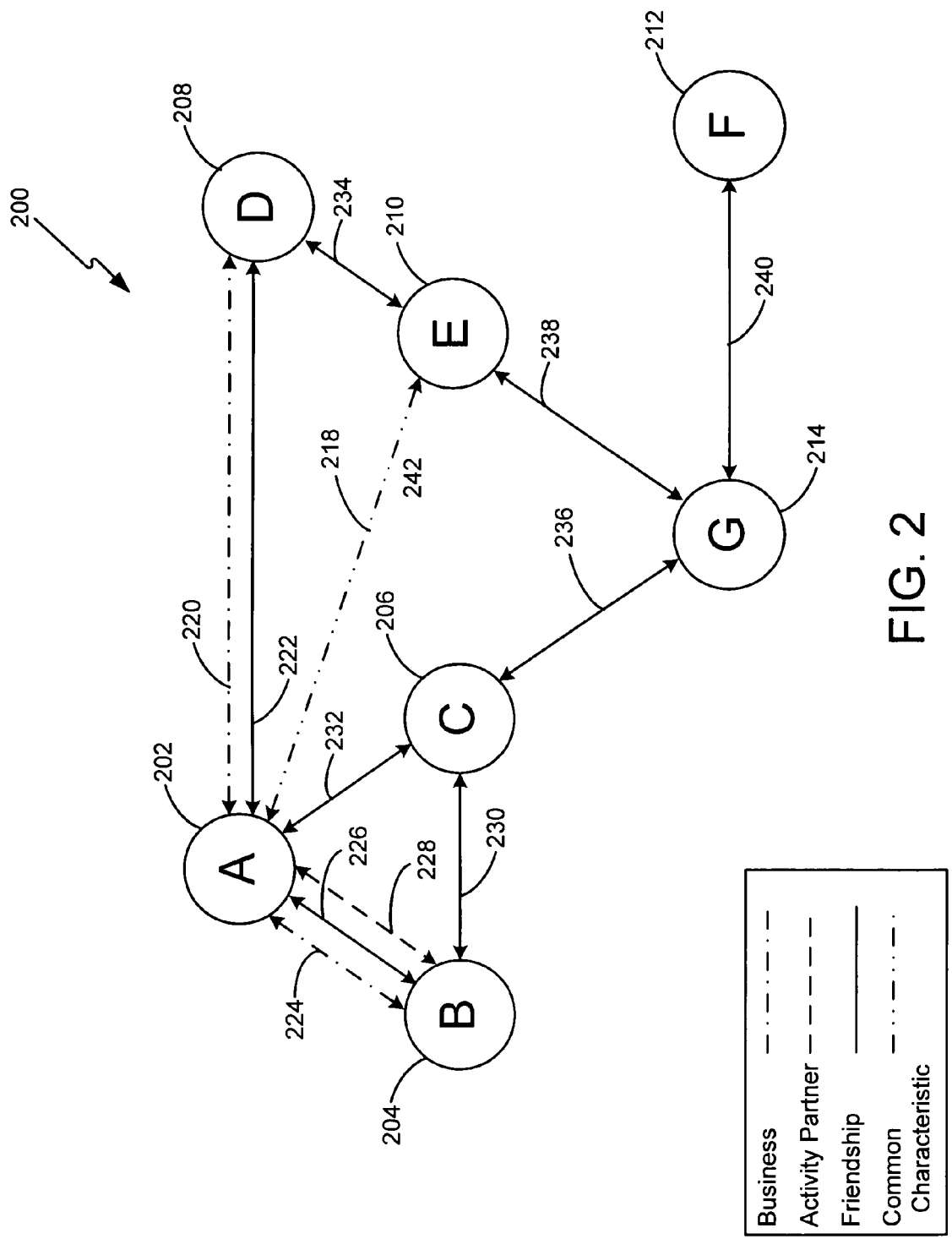
FIG. 2 shows a diagram of a social network 200 according to one embodiment of the present invention.

FIG. 2 shows a diagram of a social network 200 according to one embodiment of the present invention. According to the embodiment illustrated in FIG. 2, the social network 200 is illustrated with a graph comprising vertices 202, 204, 206, 208, 210, 212, and 214 and edges 218, 220, 222, 224, 226, 228, 230, 232, and 234. The vertices 202, 204, 206, 208, 210, 212, and 214 comprise profiles A, B, C, D, E, F, and G, respectively. Each profile can represent a member profile of a member of the social network 200. The exemplary network 200 shown in FIG. 2 has seven members. Considerably more members can be part of the social network 200. A member can be an entity such as, for example, a person, an organization, a business, a corporation, a community, a fictitious person, or other suitable entity.

Each member profile can contain entries, and each entry can comprise information associated with a profile. For example, a person's member profile can contain: personal information, such as relationship status, birth date, age, children, ethnicity, religion, political view, sense of humor, sexual orientation, fashion preferences, smoking habits, drinking habits, pets, hometown location, passions, sports, activities, favorite books or music, TV or movie preferences, and favorite cuisines; contact information, such as email addresses, location information, instant messenger name, telephone numbers, and address; professional information, such as job title, employer, and skills; educational information, such as schools attended and degrees obtained, and any other suitable information describing, identifying, or otherwise associated with a person. A business' member profile can, for example, contain a description of the business, and information about its market sector, customer base, location, suppliers, net profits, net worth, number of employees, stock performance, contact information, and other types of suitable information associated with the business.

A member profile can also contain rating information associated with the member. For example, the member can be rated or scored by other members of the social network 200 in specific categories, such as humor, intelligence, fashion, trustworthiness, sexiness, and coolness. A member's category ratings can be contained in the member's profile. In one embodiment of the social network, a member can have fans. Fans can be other members who have indicated that they are "fans" of the member. Rating information can also include the number of fans of a member and identifiers of the fans. Rating information can also include the rate at which a member accumulated ratings or fans and how recently the member has been rated or acquired fans.

A member profile can also contain membership information associated with the member. Membership information can include information about a member's login patterns to the social network, such as the frequency that the member logs in to the social network and the member's most recent login to the social network. Membership information can also include information about the rate and frequency that a member profile gains associations to other member profiles. In a social network that comprises advertising or sponsorship, a member profile may contain consumer information. Consumer information may include the frequency, patterns, types, or number of purchases the member makes, or information about which advertisers or sponsors the member has accessed, patronized, or used.

A member profile may comprise data stored in memory. The profile, in addition to comprising data about the member, can also comprise data relating to others. For example, a member profile can contain an identification of associations or virtual links with other member profiles. In one embodiment, a member's social network member profile may comprise a hyperlink associated with another member's profile. In one such association, the other member's profile may contain a reciprocal hyperlink associated with the first member's profile. A member's profile may also contain information excerpted from another associated member's profile, such as a thumbnail image of the associated member, his or her age, marital status, and location, as well as an indication of the number of members with which the associated member is associated. In one embodiment, a member's profile may comprise a list of other social network members' profiles with which the member wishes to be associated.

An association may be designated manually or automatically. For example, a member may designate associated members manually by selecting other profiles and indicating an association that can be recorded in the member's profile. Also, an association between two profiles may comprise an association automatically generated in response to a predetermined number of common entries, aspects, or elements in the two members' profiles. In one embodiment, a member profile may be associated with all of the other member profiles comprising a predetermined number or percentage of common entries, such as interests, hobbies, likes, dislikes, employers and/or habits.

Associations between profiles within a social network can be of a single type or can be multiple types and can include, for example, friendship associations, business associations, family associations, community associations, school associations, or any other suitable type of link between profiles. Associations can further be weighted to represent the strength of the association. For example, a friendship association can be weighted more than a school association. Each type of association can have various levels with different weights associated with each level. For example, a friendship association can be classified according to which of a plurality of friendship association levels it belongs to. In one embodiment, a friendship association may be assigned a level by the member from a list of levels comprising: a best friend, a good friend, a regular friend, an acquaintance, and a friend the member has not met.

In FIG. 2, the edges 218, 220, 222, 224, 226, 228, 230, 232, and 234 shown comprise associations between profiles. According to the embodiment shown in FIG. 2, the social network 200 comprises a plurality of differing types of associations represented by edges 218, 220, 222, 224, 226, 228, 230, 232, and 234. The types of associations shown in FIG. 2 for illustration purposes are business associations, activity partner associations, friendship associations, community associations, and common characteristic associations. Common characteristic associations may include, for example, associations based on some characteristic, such as attending the same high school or being from the same hometown, and can indicate a lower level of significance than another type of association, such as a friendship association.

Referring to FIG. 2, edge 220 and edge 222 each comprise an association between profile A at vertex 202 and profile D at vertex 208. The edge 220 represents a business association, and the edge 222 represents a friendship association. Profile A is also associated with profile E by a common characteristic association comprising edge 218. The association between profile A and profile E may be more attenuated than the association between profile A and D, but the association can still be represented by the social network depicted in FIG. 2.

Each member represented by the profiles A, B, C, D, E, F, and G comprising the vertices 202, 204, 206, 208, 210, 212, and 214, respectively, for purposes of illustration, comprises a person. Other types of members can be in social network 200. For example, communities, special interest groups, organizations, political parties, universities, and legal persons, such as corporations and business partnerships may be members of the social network 200. The associations 218, 220, 222, 224, 226, 228, 230, 232, and 234 illustrated in FIG. 2 comprise bi-directional associations. An association between two profiles may comprise a bi-directional association when both parties to the association are associated with each other. For example, in FIG. 2, profile A is associated with profile D, and profile D is also associated with profile A. In one embodiment, profiles A and D will not be bi-directionally associated with each other until both profiles consent to such an association. For example, profile A may invite profile D to be associated therewith, and the bi-directional association occurs upon profile D's acceptance of such invitation. The invitation, for example, may include sending an email or other message to profile D indicating that profile A has requested an association with profile D.

Other embodiments of the present invention may comprise directed associations or other types of associations. Directed associations can associate a first profile with a second profile while not requiring the second profile to be associated with the first profile. For example, profile A can be associated by a friendship association with profile B, and profile B can be unassociated with profile A, or profile B can be associated with profile A through a different type of association, such as a business association. Thus a display of profile A's friends would include profile B, but a display of profile B's friends would not include profile A.

Within a social network, a degree of separation can be determined for associated profiles. In one embodiment, a degree of separation between two profiles can be determined the fewest number of edges of a certain type separating the associated profiles. In another embodiment, a type-specific degree of separation may be determined. A type-specific degree of separation comprises a degree of separation determined based on one particular type of association. For example, a profile A has a friend association degree of separation of two from profile E. The fewest number of friendship associations between profile A and profile E is two—the friendship association comprising edge 222 between profiles A and D and the friendship association comprising edge 234 between profiles D and E. Thus, for the associated profiles A and E, the degree of friendship separation, determined according to one aspect of one embodiment of the present invention, is two.

Another type-specific degree of separation can also be determined for profiles A and E. For example, a common characteristic degree of separation can be determined by determining the fewest number of common characteristic associations separating profile A and profile E. According to the embodiment depicted in FIG. 2, there is one common characteristic association, comprising edge 218, separating profiles A and E. Thus, the common characteristic association degree of separation, according to the embodiment depicted in FIG. 2, is one. The common characteristic in this example can be that profile A attended the same high school as profile E. A common characteristic association may be selected by profiles A and E to represent that they are associated in some fashion, but to not create a close association, such as with a friendship association.

According to other aspects of certain embodiments of the present invention, the degree of separation may be determined by use of a weighting factor assigned to each association. For example, close friendships can be weighted higher than more distant friendships. According to certain aspects of embodiments using a weighting factor, a higher weighting factor for an association can reduce the degree of separation between profiles and lower weighting factors can increase the degree of separation. This can be accomplished, for example, by establishing an inverse relationship between each associations and a corresponding weighting factor prior to summing the associations. Thus, highly weighted associations would contribute less to the resulting sum than lower weighted associations.

Process

Various methods may be implemented in the environment shown in FIG. 1 and other environments, according to the present invention. Methods according to the present invention may be implemented by, for example, a processor-executable program code stored on a computer-readable medium.

For example, one embodiment according to the present invention comprises identifying gift interest data from a person wishing to create a gift registry, and then automatically generating a gift registry comprising a gift indicator associated with the gift interest data. Gift interest data comprises data associated with a gift of interest or possible interest. The gift interest data may comprise, for example, a gift category comprising a gift included in the gift registry and other similar gifts, an attribute of the gift included in the gift registry, or a specified product or service a registrant wishes to receive as a gift. A gift category comprises a category reflecting one or more possible gifts. Examples of gift categories comprise toys, games, jewelry, wall art, electronic devices, clothing, etc. A gift attribute comprises an attribute of a gift. Examples of gift attributes comprise luxurious, practical, requires batteries, non-violent, loud, brightly colored, suitable for children, etc. Gift interest data comprising a specified product may comprise a particular brand and model number the registrant know he or she would like to receive. An example of gift interest data comprising a specified service may comprise a one-hour massage with a particular massage therapist. A gift indicator comprises data indicating or identifying, at least in part, a gift. A gift indicator may comprise, for example, a text description of a gift, a thumbnail image of a gift, and/or a product or merchant number or SKU associated with a gift.

In carrying out one embodiment, the social network engine 120, as shown in FIG. 1, may identify (e.g., receive) gift interest data. The gift interest data may be generated by the user 112*a*. For example, the user 112*a* may input his or her gift interests and preferences into a user interface on the client device 102*a* by modifying or creating a member profile associated with the user 112*a* on the social network engine 120. These input interests and preferences may be output as gift interest data to the social network engine 120 over the network 106. In one embodiment, identifying the gift interest data may comprise implicitly generating the gift interest data based upon the member profile associated with the user 112*a* and stored in the social network database 130. For example, the sex, age, interests, and hobbies the user 112*a* has previously provided for his or her member profile may be used to identify or suggest categories, types, or attributes of gifts, and specific products and services that the user 112*a* may find appealing, desirable or useful. The social network engine 120 may then store the gift interest data in the social network database 130.

When generating the gift registry, the social network engine 120 may generate and output a request signal. A request signal comprises a signal, such as data, indicating a request. The request signal may indicate a request for permission to add a proposed gift to the gift registry. For example, the social network engine 120 may output a request to the user 112a over the network 106 to make a decision about the acceptability of a proposed gift associated with the gift interest data input by the user 112a. If the proposed gift is acceptable to the user 112a, he or she may respond to the request signal by sending a reply signal indicating that the proposed gift should be included in the gift registry. The social network engine 120 may then add the proposed gift to the gift registry. Conversely, if the proposed gift is unacceptable to the user 112a, he or she may respond with a reply signal indicating that the proposed gift should be excluded from the gift registry.

One embodiment may further comprise identifying an audience criterion. An audience criterion comprises a criterion indicating an audience (or audiences) of inclusion or exclusion. The user associated with the gift registry may provide an audience criterion. The audience criterion may represent, for example, the audience to which the provider of the gift interest data wishes to display the resulting gift registry, or parts of the resulting gift registry. The audience criterion may comprise, for example, a degree of separation, such as a type-specific degree of separation. For instance, a registrant represented by node A (202) in FIG. 2, may require that only those people separated by a single degree of separation may view the gift registry. According to such an audience criterion, gift givers, as represented by nodes B-G (204-214) would either be permitted to view the gift registry if they are within one degree of separation, or would be unable to do so if separated from node A 202 by more than one degree of separation. For instance, the gift givers represented by nodes B, C, D, and E 204-210 would be able to view the gift registry, but the gift givers represented by nodes G and F 212, 214 would not.

Another embodiment may employ a type-specific degree of separation audience criterion. For example, in one such embodiment, the audience criterion may comprise whether the potential gift registry viewer has a first degree of separation that is business related. In an embodiment employing such a type-specific degree of separation audience criterion, only the potential gift registry viewers represented by nodes B and D 204, 208 would be able to view the gift registry. In another embodiment, the audience criterion may comprise an association, such as a bi-directional association, or a directed association. In an embodiment employing a directed association, only social network members that have identified the registrant as a social network friend, and whom the registrant has identified as a social network friend would be permitted to view the gift registry.

A person considering purchasing a gift for the user who initiated the gift registry may access a computer interface connected to the network. This interface may facilitate the sending of an inquiry signal indicating an interest in viewing all or part of the user's gift registry. In one embodiment, an audience criterion may be used to evaluate a received inquiry signal. The received inquiry signal may be evaluated for satisfaction of the audience criterion, and the gift registry may be output if the inquiry signal satisfies the audience criterion. A potential gift registry viewer comprising a social network member may generate the inquiry signal. The social network member may be viewing the registrant's publicly viewable member profile information, and may become aware that the registrant has a gift registry associated with him or her. The social network member may request access to the gift registry with an inquiry signal that may comprise clicking on an icon associated with opening the gift registry. The social network engine 120 may then evaluate the inquiry signal for satisfaction of the previously identified audience criterion. For example, in an embodiment employing a degree of separation or an association for an audience criterion, the social network engine 120 may ascertain the source of the inquiry signal. The social network engine 120 may then determine whether the source of the inquiry signal satisfies the identified audience criterion. If the source of the inquiry signal satisfies the audience criterion, the gift registry will be output to the originator of the inquiry signal. If the source of the inquiry signal does not satisfy the audience criterion, the gift registry will not be output to the originator of the inquiry signal.

Certain embodiments of the present invention may include the use of advertisements associated with the gift interest data, or with a gift on the gift registry. For example, one embodiment may further comprise generating an advertisement based on the gift interest data. The generated advertisement may then be output with the gift registry. In one such embodiment, a retailer, vendor, distributor, or manufacturer of a gift included in the gift registry may be contacted to ascertain whether it would like to advertise to those viewing the gift registry, and for a fee, a pertinent advertisement may be output with the gift registry to the originator of the inquiry signal. In one embodiment, the gift registry may be output to a plurality of vendors, and the plurality of vendors may submit price bids for various gifts associated with gift indicators associated with the gift registry. In such an embodiment, the lowest price bid submitted may be output with the gift registry to allow a viewer of the gift registry a convenient method of finding which vendor has the lowest price for a particular gift.

The usefulness of a gift registry may be increased in certain embodiments by sending timely reminders about the registrant's upcoming life events to his or her friends and contacts on the social network. For example, an embodiment may further comprise generating and outputting a reminder signal. A reminder signal comprises a signal, such as data, to remind a recipient of the reminder signal about an upcoming life event of the registrant. A reminder signal may be generated and output a set period of time before a registrant's birthday, anniversary, or other special occasion, allowing enough time for the reminder signal recipients to purchase a gift found on the gift registry. In one embodiment, the reminder signal may be output to a prescribed group of friends or contacts on the social network that the registrant has previously selected for receipt. In another embodiment, the reminder signal may be output in association with the audience criterion. In one such embodiment, only social network members able to view the registrant's gift registry may receive a reminder signal. The reminder signal may comprise a pointer to the gift registry or to a gift on the gift registry. For example, the reminder signal may comprise an email message sent to the designated recipient's preferred email account. Such a reminder signal may comprise a hyperlink pointer to the gift registry or to a particular gift on the gift registry. Once the reminder signal recipient clicks on the hyperlink, he or she may be able to view the registrant's gift registry on a web browser application.

One goal a gift registrant may have when setting up a gift registry is the elimination of duplicate gifts. To achieve this goal, the gift registry may be updated in certain embodiments to reflect the purchase of gifts therein. For instance, in one embodiment, the social network engine 120 may receive a purchase signal, and the gift registry may be altered to reflect the purchase signal. A purchase signal comprises a signal, such as data, indicating activity associated with a gift associated with a gift indicator on the gift registry. The purchase signal may comprise an indication from a viewer of the gift registry that he or she will be purchasing, or has purchased a gift on the gift registry. In an embodiment where the gift registry viewer is able to purchase the gift from a vendor associated with the gift registry, the purchase signal may be generated by the vendor in response to a consummation of a purchase transaction. Upon receipt of such a purchase signal, the social network engine 120 can then modify the gift registry to reflect the purchase of the gift.

Certain embodiments may use a verification signal. A verification signal comprises a signal, such as data, verifying or indicating the existence or lack of existence of a fact. In one embodiment, a verification signal may be generated and output by the social network engine 120, and the purchase signal may be received in response to the output verification signal. A verification signal may be output by the social network engine 120 to a viewer of the gift registry who has previously indicated that he or she would be purchasing a gift for the registrant that is found on the registry. The verification signal may comprise a request to verify whether the prospective purchaser of the gift actually consummated the purchase. The verification signal may comprise, for example, an automatically generated email message to the prospective purchaser's preferred email address. The prospective purchaser may then generate and output a purchase signal indicating that he or she did, in fact, purchase the item. For example, the purchase signal may comprise a reply message generated by clicking on one of two hyperlinks contained in an automatically generated email message verification signal. One such hyperlink may comprise a "purchase completed" identifier, and the second hyperlink may comprise a "have not yet purchased" identifier. In one embodiment, the status as purchased or unpurchased of a gift on the gift registry may only be modified by the registrant or by receipt of a purchase signal generated in response to an output verification signal.

In another embodiment, the verification signal may comprise a request to the prospective purchaser to verify that a proposed gift that is about to be purchased by a bot buyer is what he or she intends to give to the registrant user 112a. In such an embodiment, the bot buyer may identify a gift registry comprising a gift indicator. The bot buyer may be capable of searching an information network for a gift associated with the gift indicator. The bot buyer may further be capable of consummating a purchase of the gift from a vendor in communication with the information network 106. The verification signal in such an embodiment may comprise a plurality of hyperlinks associated with different responses. For example, one such hyperlink may comprise a "yes, please purchase gift" identifier, and a second hyperlink may comprise a "no, please keep searching for a more suitable gift" identifier. Upon satisfaction that the proposed gift as found by the bot and comprises what the prospective purchaser wishes to give as a gift, he or she may generate and output a purchase signal. The purchase signal in such an embodiment may comprise a signal capable of instructing the bot buyer to consummate the purchase of the proposed gift. The purchase signal may further comprise a signal capable of instructing the bot buyer to continue searching for a more acceptable gift. In one embodiment, the gift registry may be modified to reflect the purchase by a bot buyer of the proposed gift. The bot buyer may purchase the gift in response to receiving the purchase signal.

In some embodiments, an information network, such as the Internet, may be used to help find gift ideas, gift vendors or pricing associated with a gift in the gift registry. For example, in one embodiment, an information network may be searched for a gift associated with the gift interest data. The social network engine 120 in such an embodiment may generate a query associated with the gift interest data and output the query to a search engine located on another server device in communication with the network 106. In another embodiment, the information network may be searched for a vendor who sells the desired gift. The information network may further be searched for a price associated with the gift, such as the lowest price currently associated with the gift. For example, the social network engine 120 may generate and output over the network 106 to the Froogle™ system a query associated with the gift interest data. In such an embodiment, the Froogle™ system may return results comprising a list of vendors and their respective current prices for the gift in question.

The method may further comprise purchasing the gift on the gift registry. The gift may be purchased using a variety of suitable currencies, including an electronic or a proprietary currency. For example, the social network engine 120 may purchase the gift from a vendor associated therewith, using a proprietary currency the vendor has previously agreed to accept. The proprietary currency may be used like a debit card. Members of a social network may add value to either their own, or another member's social network debit account. For example, in one embodiment, a member may charge to his or her credit card a specified amount of money, and the social network engine 120 may accordingly increase the amount of available proprietary currency that may be used to purchase gifts associated with gift indicators found on gift registries. For example, in one such embodiment, when a member adds $50.00 U.S. Dollar to a social network debit account, the social network engine 120 may update the appropriate social network debit account to reflect a balance including an additional 50 gift credits. In one embodiment, a member may add credit to his or her social network debit account by using a secure server to transfer funds electronically from a bank account, or by using a conventional credit card to add proprietary currency value to the appropriate social network debit account. In one embodiment, a gift-giver may add value to the registrant's social network debit account rather than purchasing a gift from the gift registry. In one such embodiment, the gift registry may comprise a notification to its viewers that the registrant would prefer that gift-givers add value to the registrant's social network debit account rather than purchase a gift from the gift registry.

Figure 3:
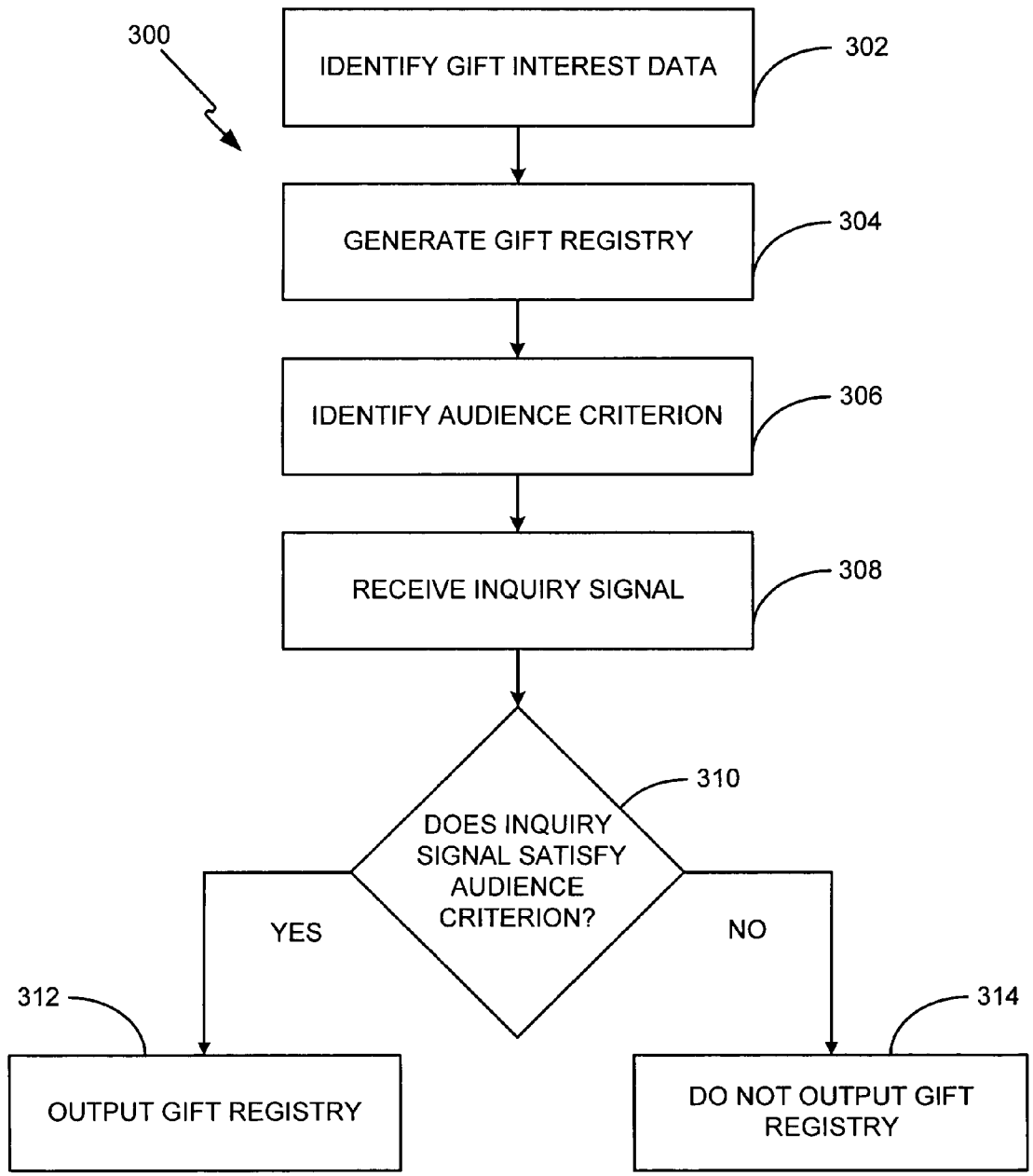
FIG. 3 shows a flow diagram of a method according to one embodiment of the present invention.

Referring again to the drawings, in which like numerals indicate like elements throughout the several figures, FIG. 3 shows a flow diagram of a method according to one embodiment of the present invention. FIG. 3 shows a method 300 for providing a gift. This method 300 is provided by way of example, as there are a variety of ways to carry out methods according to the present invention. The method 300 shown in FIG. 3 can be executed or otherwise performed by one or a combination of various systems. The method 300 is described below as carried out by the system 100 shown in FIG. 1 by way of example, and various elements of the system 100 are referenced in explaining the example method of FIG. 3.

As shown in block 302, the method 300 comprises identifying gift interest data. For example, a social network engine 120 may receive gift interest data generated by a client device 102a and output to the server device 104 over the network 106. The gift interest data may comprise a combination of different types of data, such as a gift categories, gift attributes, and specified products and services. For example, the gift interest data may comprise an indication that one gift the user 112a is interested in adding to his or her gift registry comprises a Fisher Price® red toy boat.

As shown in block 304, the social network engine 120 may then generate a gift registry. The generated gift registry will comprise at least one gift that is associated with the gift interest data. The matching processor 122 may attempt to match the identified gift interest data with gifts having as many of the requested features, attributes, and aspects specified as possible. The social network engine 120 may perform a search of an information network, such as the Internet, or a search of an index of gifts popular with other members of a social network stored in the social network database 130 to find the best gift for the current user 112a in light of the gift interest data. The gift registry may comprise a web page article associated with a member profile of a member of a social network. The gift registry may also comprise a list text descriptions, each accompanied by a thumbnail image of the desired gift and a hyperlinks, each such hyperlink associated with a vendor site accessible over the network 106 that sells the gift.

As shown in block 306, the method 300 further comprises identifying an audience criterion. The audience criterion may be generated by the user 112a wishing to generate a gift registry by inputting and sending to the social network engine 120 a criterion for those who may view all or a portion of his or her gift registry. The social network engine 120 may identify the audience criterion. The audience criterion may comprise, for example, a requirement that only those members of the social network that have one degree of separation from the registrant user 112a may view the gift registry. In another embodiment, the audience criterion may comprise a requirement that a potential viewer of the gift registry who generates an inquiry signal share a common characteristic with the registrant, for instance, that they both have the same wedding anniversary date.

The method 300 shown in FIG. 3 further comprises receiving an inquiry signal as shown by block 308. The inquiry signal may be generated by a user 112b of a client device 102b in communication with the network 106. The user 112b may comprise a member of the same social network that the user 112a is a member of. In one embodiment, the user 112b wishing to view the gift registry may have been alerted to the presence of the registrant user's 112a gift registry by a reminder signal generated and output by the social network engine 120. In another embodiment, the user 112b may have become aware of the gift registry when viewing user's 112a member profile available for viewing on the social network. The user 112b may then generate an inquiry signal by clicking a hyperlink associated with the gift registry.

The method 300 further comprises evaluating the received inquiry signal for satisfaction of the audience criterion set by the user 112a as shown by block 310. For example, the matching processor 122 may identify the source of the inquiry signal and determine whether the originator of the inquiry signal satisfies the applicable audience criterion. If, as shown in block 312, the inquiry signal does satisfy the audience criterion, the gift registry is output. The gift registry may be output as an HTTP document to the originator of the inquiry signal over the network 106. If, as shown in block 314, the inquiry signal does not satisfy the audience criterion, the gift registry will not be output. In this way, the registrant user 112a may control access to the gift registry. In one embodiment, only a portion of the gift registry may be subject to the audience criterion. In such an embodiment, only that portion of the gift registry subject to the audience criterion may be withheld from a potential viewer if the inquiry signal does not meet the audience criterion.

Figure 4:
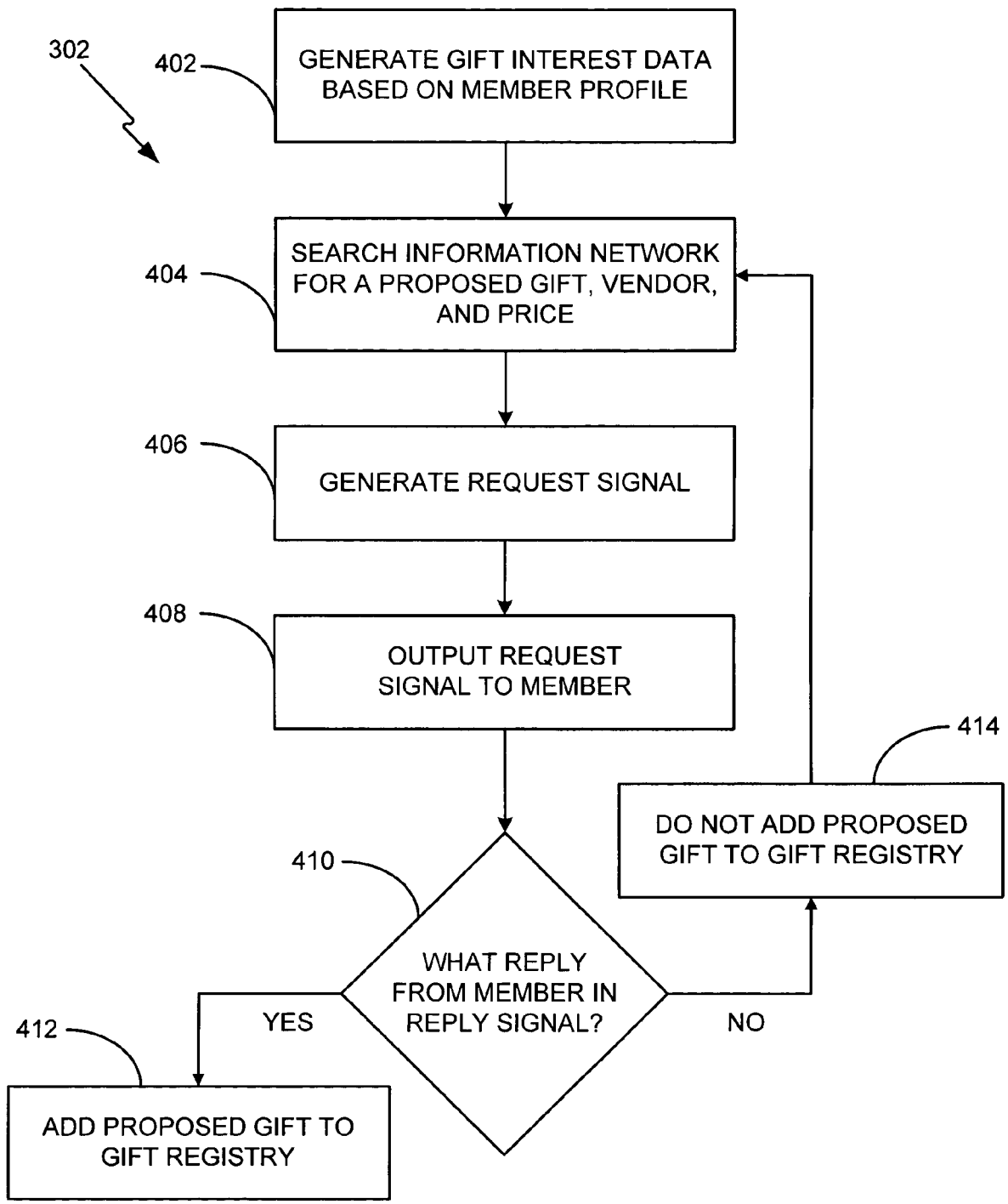
FIG. 4 shows a flow diagram of a subroutine of the method of FIG. 3 according to one embodiment of the present invention.

FIG. 4 shows a flow diagram of a subroutine of the method of FIG. 3 according to one embodiment of the present invention. FIG. 4 shows a subroutine 302 that shows a method for generating a gift registry in accordance with one embodiment of the present invention. As shown in block 402, the subroutine 302 comprises implicitly generating gift interest data based on information contained in a member profile. The member profile may comprise entries. The entries may comprise personal information about a member of a social network he or she is willing to make available to other members of the social network. In one embodiment, the matching processor 122 may generate the gift interest data by associating the stated hobbies or interests, age, and location of a member as found in with his or her member profile with attributes or categories of gifts.

As shown by block 404, the subroutine 302 further comprises searching an information network, such as the Internet, for a proposed gift associated with the implicitly generated gift interest data. In the embodiment shown, the social network engine 120 further searches the information network for an on-line vendor that vends the proposed gift, and a price associated with the proposed gift. For example, the social network engine may perform a search of the Froogle™ system using the implicitly generated gift interest data as a search query.

Information gathered about the proposed gift or gifts may then be organized, and as shown in block 406, a request signal is generated. The request signal comprises a request for permission to add the proposed gift to a gift registry. The request signal may comprise an automatically generated email message delivered to the inbox of the member of the social network's preferred email address. The request signal may further comprise a list of proposed gifts, vendors who carry the proposed gifts, and the lowest price currently associated with each respective proposed gift. The request signal may further comprise a plurality of virtual buttons the member may use to quickly and easily generate a reply signal. As shown in block 408, the generated request signal is then output to the member from whom the gift interest data was implicitly generated. For example, the request signal may be output over the network 106 to the client device 102a the member user 112a regularly uses.

As shown by block 410, the member receiving the request signal is requested to evaluate the proposed gift associated with the gift interest data implicitly generated from the member's social network member profile. If, as shown in block 412, the member responds positively to the proposed gift, and generates and outputs a reply signal indicating his or her acceptance of the proposed gift, it will be added to a gift registry associated with the member's social network member profile. If, as shown in block 414, the proposed gift is not acceptable to the member, the proposed gift will not be added to the gift registry, and the social network engine 120 may then again search the information network for a new proposed gift associated with the implicitly generated gift interest data for the member as shown in block 404. In another embodiment, the social network engine 120 may refrain from searching for a new proposed gift. In yet another embodiment, the social network processor 120 may perform a search for a new proposed gift after adding an acceptable gift to the gift registry.

General

The foregoing description of embodiments of the invention has been presented only for the purpose of illustration and description and is not intended to be exhaustive or to limit the invention to the precise forms disclosed. Numerous modifications and adaptations thereof will be apparent to those skilled in the art without departing from the spirit and scope of the present invention.

The invention claimed is:

1. A computer-implemented method for providing a gift registry, the method executed by a computer and comprising:
   generating a profile for a gift recipient in response to receiving information about the gift recipient;
   storing the gift recipient's profile in a profile database;
   implicitly generating gift interest data based at least in part on the gift recipient's stored profile;
   generating a gift registry for the gift recipient comprising a gift indicator associated with the implicitly generated gift interest data;
   identifying an audience criterion that indicates a relationship requirement between the gift recipient and a member that must be met in order for the member to access the gift registry, wherein the relationship requirement specifies conditions for a relationship requirement path in a data structure that represents members of a social network, the data structure comprising vertices representing profiles of the members of the social network and edges representing relationships between pairs of profiles, the relationship requirement path extending between a vertex that represents the gift recipient's profile and a vertex that represents the member's profile and comprising one or more edges;
   receiving an inquiry indication from a gift giver to view the gift registry, wherein the gift giver has a profile;
   identifying in the data structure a first vertex associated with the gift recipient's profile and a second vertex associated with the gift giver's profile in response to receiving the inquiry indication;
   identifying a path between the first vertex and the second vertex;
   determining the identified path satisfies the relationship requirement; and
   displaying the gift registry to the gift giver responsive to satisfaction of the relationship requirement.

2. The method of claim 1, further comprising generating an advertisement based, at least in part, on the gift interest data.

3. The method of claim 2, further comprising displaying the advertisement with the gift registry.

4. The method of claim 1, further comprising providing a reminder indication.

5. The method of claim 4, wherein the reminder indication comprises a pointer to the gift registry.

6. The method of claim 4, wherein the reminder indication comprises a pointer to the gift indicator.

7. The method of claim 1, further comprising:
   receiving a purchase indication; and
   altering the gift registry to reflect the purchase indication.

8. The method of claim 1, further comprising searching an information network for a gift associated with the gift indicator.

9. The method of claim 1, further comprising searching an information network for a vendor of a gift associated with the gift indicator.

10. The method of claim 1, further comprising searching an information network for a price associated with a gift associated with the gift indicator.

11. The method of claim 10, wherein the price comprises a lowest price associated with the gift.

12. The method of claim 1, further comprising generating a request indication, the request indication requesting permission to add a proposed gift indicator to the gift registry.

13. The method of claim 1, further comprising purchasing a gift associated with the gift indicator using an electronic currency.

14. The method of claim 1, further comprising purchasing a gift associated with the gift indicator using a proprietary currency.

15. The method of claim 1, wherein the gift interest data comprises a gift category comprising a gift associated with the gift indicator.

16. The method of claim 1, wherein the gift interest data comprises an attribute of a gift associated with the gift indicator.

17. The method of claim 1, wherein the gift interest data comprises a specific product.

18. The method of claim 1, wherein the gift recipient's profile comprises information about the gift recipient selected from the group consisting of information about the gift recipient's sex, age, and hobbies.

19. The method of claim 1, wherein the relationship requirement path comprises a degree of separation between the vertex that represents the gift recipient's profile and the vertex that represents the member's profile.

20. The method of claim 19, wherein the degree of separation comprises a type-specific degree of separation.

21. The method of claim 1, wherein the relationship requirement path comprises an association between the vertex that represents the gift recipient's profile and the vertex that represents the member's profile.

22. The method of claim 1, wherein the gift recipient is a member of the social network and the gift recipient's profile comprises information about the gift recipient that the gift recipient has made available to other specified members of the social network.

23. A computer-implemented method for providing a gift registry, the method executed by a computer and comprising:
   generating a profile for a gift recipient in response to receiving information about the gift recipient;
   storing the gift recipient's profile in a profile database;
   implicitly generating gift interest data based at least in part upon the gift recipient's stored profile;
   searching an information network for a gift associated with the implicitly-generated gift interest data;
   generating a gift registry for the gift recipient comprising a gift indicator associated with the gift;
   identifying an audience criterion that indicates a relationship requirement between the gift recipient and a member that must be met in order for the member to access the gift registry, wherein the relationship requirement specifies conditions for a relationship requirement path in a data structure that represents members of a social network, the data structure comprising vertices representing profiles of the members of the social network and edges representing relationships between pairs of profiles, the relationship requirement path extending between a vertex that represents the gift recipient's profile and a vertex that represents the member's profile and comprising one or more edges;
   providing to a gift giver a reminder indication comprising a pointer to the gift registry;
   receiving an inquiry indication from the gift giver to view the gift registry, wherein the gift giver has a profile;
   identifying in the data structure a first vertex associated with the gift recipient's profile and a second vertex associated with the gift giver's profile in response to receiving the inquiry indication;
   identifying a path between the first vertex and the second vertex;

determining the identified path satisfies the relationship requirement;

displaying the gift registry to the gift giver responsive to satisfaction of the relationship requirement;

receiving a purchase indication of a gift from the gift registry; and altering the gift registry to reflect the purchase indication.

24. A computer-readable medium on which is encoded program code executable on a computer processor, the program code comprising:

program code for generating a profile for a gift recipient in response to receiving information about the gift recipient;

program code for implicitly generating gift interest data based at least in part on the gift recipient's profile;

program code for generating a gift registry for the gift recipient comprising a gift indicator associated with the implicitly generated gift interest data;

program code for identifying an audience criterion that indicates a relationship requirement between the gift recipient and a member that must be met in order for the member to access the gift registry, wherein the relationship requirement specifies conditions for a relationship requirement path in a data structure that represents members of a social network, the data structure comprising vertices representing profiles of the members of the social network and edges representing relationships between pairs of profiles, the relationship requirement path extending between a vertex that represents the gift recipient's profile and a vertex that represents the member's profile and comprising one or more edges;

program code for receiving an inquiry indication from a gift giver to view the gift registry, wherein the gift giver has a profile;

program code for identifying in the data structure a first vertex associated with the gift recipient's profile and a second vertex associated with the gift giver's profile in response to receiving the inquiry indication;

program code for identifying a path between the first vertex and the second vertex;

program code for determining the identified path satisfies the relationship requirement; and program code for displaying the gift registry to the gift giver responsive to satisfaction of the relationship requirement.

25. The computer-readable medium of claim 24, further comprising program code for generating an advertisement based, at least in part, on the gift interest data.

26. The computer-readable medium of claim 25, further comprising program code for displaying the advertisement with the gift registry.

27. The computer-readable medium of claim 24, further comprising program code for providing a reminder indication.

28. The computer-readable medium of claim 27, wherein the reminder indication comprises a pointer to the gift registry.

29. The computer-readable medium of claim 27, wherein the reminder indication comprises a pointer to the gift indicator.

30. The computer-readable medium of claim 24, further comprising:

program code for receiving a purchase indication; and program code for altering the gift registry to reflect the purchase indication.

31. The computer-readable medium of claim 24, further comprising program code for searching an information network for a gift associated with the gift indicator.

32. The computer-readable medium of claim 24, further comprising program code for searching an information network for a vendor of a gift associated with the gift indicator.

33. The computer-readable medium of claim 24, further comprising program code for searching an information network for a price associated with a gift associated with the gift indicator.

34. The computer-readable medium of claim 33, wherein the price comprises a lowest price associated with the gift.

35. The computer-readable medium of claim 24, further comprising program code for generating a request indication, the request indication requesting permission to add a proposed gift indicator to the gift registry.

36. The computer-readable medium of claim 24, further comprising program code for purchasing a gift associated with the gift indicator using an electronic currency.

37. The computer-readable medium of claim 24, further comprising program code for purchasing a gift associated with the gift indicator using a proprietary currency.

38. The computer-readable medium of claim 24, wherein the gift interest data comprises a gift category comprising a gift associated with the gift indicator.

39. The computer-readable medium of claim 24, wherein the gift interest data comprises an attribute of a gift associated with the gift indicator.

40. The computer-readable medium of claim 24, wherein the gift interest data comprises a specific product.

41. The computer-readable medium of claim 24, wherein the gift recipient's profile comprises information about the gift recipient selected from the group consisting of information about the gift recipient's sex, age, and hobbies.

42. The computer-readable medium of claim 24, wherein the relationship requirement path comprises a degree of separation between the vertex that represents the gift recipient's profile and the vertex that represents the member's profile.

43. The computer-readable medium of claim 42, wherein the degree of separation comprises a type-specific degree of separation.

44. The computer-readable medium of claim 24, wherein the relationship requirement path comprises an association between the vertex that represent the gift recipient's profile and the vertex that represents the member's profile.

45. A computer-readable medium on which is encoded program code executable on a computer processor, the program code comprising:

program code for generating a profile for a gift recipient in response to receiving information about the gift recipient;

program code for implicitly generating gift interest data based at least in part upon the gift recipient's profile;

program code for searching an information network for a gift associated with the implicitly generated gift interest data;

program code for generating a gift registry for the gift recipient comprising a gift indicator associated with the gift;

program code for identifying an audience criterion that indicates a relationship requirement between the gift recipient and a member that must be met in order for the member to access the gift registry, wherein the relationship requirement specifies conditions for a relationship requirement path in a data structure that represents members of a social network, the data structure comprising vertices representing profiles of the members of the social network and edges representing relationships between pairs of profiles, the relationship requirement path extending between a vertex that represents the gift recipient's profile and a vertex that represents the member's profile and comprising one or more edges;

program code for providing to a gift giver a reminder indication comprising a pointer to the gift registry;

program code for receiving an inquiry indication from the gift giver to view the gift registry, wherein the gift giver has a profile;

program code for identifying in the data structure a first vertex associated with the gift recipient's profile and a second vertex associated with the gift giver's profile in response to receiving the inquiry indication;

program code for identifying a path between the first vertex and the second vertex;

program code for determining the identified path satisfies the relationship requirement;

program code for displaying the gift registry to the gift giver responsive to satisfaction of the relationship requirement;

program code for receiving a purchase indication of a gift from the gift registry; and program code for altering the gift registry to reflect the purchase indication.

46. A computer-implemented method for providing a gift registry, the method executed by a computer and comprising:

generating a profile for a gift recipient in response to receiving information about the gift recipient;

storing the gift recipient's profile in a profile database;

implicitly generating gift interest data based at least in part on the gift recipient's stored profile;

generating a gift registry for the gift recipient comprising a gift indicator associated with the implicitly generated gift interest data;

identifying a requirement that must be met in order for a member to access the gift registry, wherein the requirement specifies conditions for a relationship requirement path in a data structure that represents members of a social network, the data structure comprising vertices representing members of the social network and edges representing relationships between pairs of members, the relationship requirement path extending between a vertex that represents the gift recipient and a vertex that represents the member and comprising one or more edges;

receiving a request from a gift giver to access the gift registry;

identifying in the data structure a first vertex associated with the gift recipient and a second vertex associated with the gift giver in response to receiving the request;

identifying a path between the first vertex and the second vertex;

determining the identified path satisfies the relationship requirement; and displaying the gift registry to the gift giver responsive to determining that the identified path satisfies the relationship requirement.

47. The method of claim 46, wherein the relationship requirement path comprises a degree of separation between the vertex that represents the gift recipient and the vertex that represents the member.

48. The method of claim 47, wherein the degree of separation comprises a type-specific degree of separation.

49. The method of claim 46, wherein the relationship requirement path comprises an association between the vertex that represents the gift recipient and the vertex that represents the member.

* * * * *

UNITED STATES PATENT AND TRADEMARK OFFICE
CERTIFICATE OF CORRECTION

PATENT NO. : 7,603,292 B1 Page 1 of 1
APPLICATION NO. : 10/882699
DATED : October 13, 2009
INVENTOR(S) : Richard William Bragg et al.

It is certified that error appears in the above-identified patent and that said Letters Patent is hereby corrected as shown below:

Column 18, Claim 44, Line 44, please delete "represent" and insert --represents--.

Signed and Sealed this

Fifth Day of January, 2010

David J. Kappos
*Director of the United States Patent and Trademark Office*

UNITED STATES PATENT AND TRADEMARK OFFICE
CERTIFICATE OF CORRECTION

PATENT NO. : 7,603,292 B1  Page 1 of 1
APPLICATION NO. : 10/882699
DATED : October 13, 2009
INVENTOR(S) : Bragg et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 734 days.

Signed and Sealed this

Fifth Day of October, 2010

David J. Kappos
*Director of the United States Patent and Trademark Office*